US011630899B2

(12) United States Patent
Vichare et al.

(10) Patent No.: US 11,630,899 B2
(45) Date of Patent: Apr. 18, 2023

(54) SYSTEMS AND METHODS OF IMPLEMENTING SECURITY CONTEXT AWARE RESPONSE TIME OPTIMIZATION

(71) Applicant: Dell Products, LP, Round Rock, TX (US)

(72) Inventors: Nikhil M. Vichare, Austin, TX (US); Mohit Arora, Leander, TX (US); Danilo O. Tan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 435 days.

(21) Appl. No.: 16/529,709

(22) Filed: Aug. 1, 2019

(65) Prior Publication Data

US 2021/0034756 A1     Feb. 4, 2021

(51) Int. Cl.
  *G06F 21/57* (2013.01)
  *G06F 21/55* (2013.01)

(52) U.S. Cl.
  CPC ............ *G06F 21/577* (2013.01); *G06F 21/55* (2013.01)

(58) Field of Classification Search
  CPC ...... G06F 21/577; G06F 21/53; G06F 21/572; G06F 21/55; G06F 21/554; G06F 21/57; G06F 21/552; G06F 2221/034; G06N 20/00
  See application file for complete search history.

(56) References Cited

U.S. PATENT DOCUMENTS

| | | | |
|---|---|---|---|
| 10,438,001 B1 * | 10/2019 | Hariprasad | G06F 21/577 |
| 2005/0206960 A1 * | 9/2005 | Shibata | H04N 1/00217 |
| | | | 358/448 |
| 2009/0178033 A1 * | 7/2009 | Challener | G06F 9/4411 |
| | | | 726/2 |
| 2019/0182287 A1 * | 6/2019 | Hanley | H04L 63/20 |
| 2019/0311137 A1 * | 10/2019 | Mallya | G06N 20/00 |
| 2019/0347423 A1 * | 11/2019 | Sanossian | H04L 41/0853 |
| 2020/0074078 A1 * | 3/2020 | Saxe | G06F 21/56 |

OTHER PUBLICATIONS

"What is a virtual machine?" by Microsoft Azure (Year: 2019).*

* cited by examiner

*Primary Examiner* — Minh Dinh
(74) *Attorney, Agent, or Firm* — Prol Intellectual Property Law, PLLC; H. Kenneth Prol (57) ABSTRACT

An information handling system may include a processor to execute code of a threat level detection module to receive and store in memory labeled data descriptive of operating environment variables related to the information handling system including operating environment variables selected from a basic input/output system (BIOS) setting, an information handling system hardware setting, and at least one of an operating system (OS) environment setting, a developer tool access setting, or a network setting; the processor to determine, via execution of a machine learning process of the threat level detection module, a threat level value; and a security module associated with a first application executed on the information handling system to: map the threat level value with the first application; and adjust the security level associated with the first application based on the provided threat level value to modify security checks operating with the first application.

20 Claims, 5 Drawing Sheets

SYSTEMS AND METHODS OF IMPLEMENTING SECURITY CONTEXT AWARE RESPONSE TIME OPTIMIZATION

FIELD OF THE DISCLOSURE

The present disclosure generally relates to an information handling system that dynamically scales security settings. The present disclosure more specifically relates to an information handling system that, in real-time and dynamically, receives data about an operating environment related to the information handling system to, with a machine learning process, infers threat levels related to the operating variables associated with the operation of the information handling system and dynamically adjusts security processes and procedures to provide faster response times of the applications while maintaining a level of security.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a system and method to reduce the security levels associate with applications executed on an information handling system based on the operating environment variables the information handling system is within. The operating environment variables may indicate that a reduction of security measures related to any given application may be reduced if found "safe" to do so or maintained/increased if found "unsafe." A machine learning process may be implemented to receive, as input, the operating environment variables and determine whether the operating environment variables place the information handling system in an unsafe or safe situation. The output resulting from the machine learning process may be mapped to any individual application executed on the information handling system so as to allow for the reduction in security measures if safe to do so thereby allowing for the granular (application by application) reduction in security measures. The reduction in security measures allows for quicker application response time thereby increasing the user satisfaction during operation of the information handling system.

Figure 1:
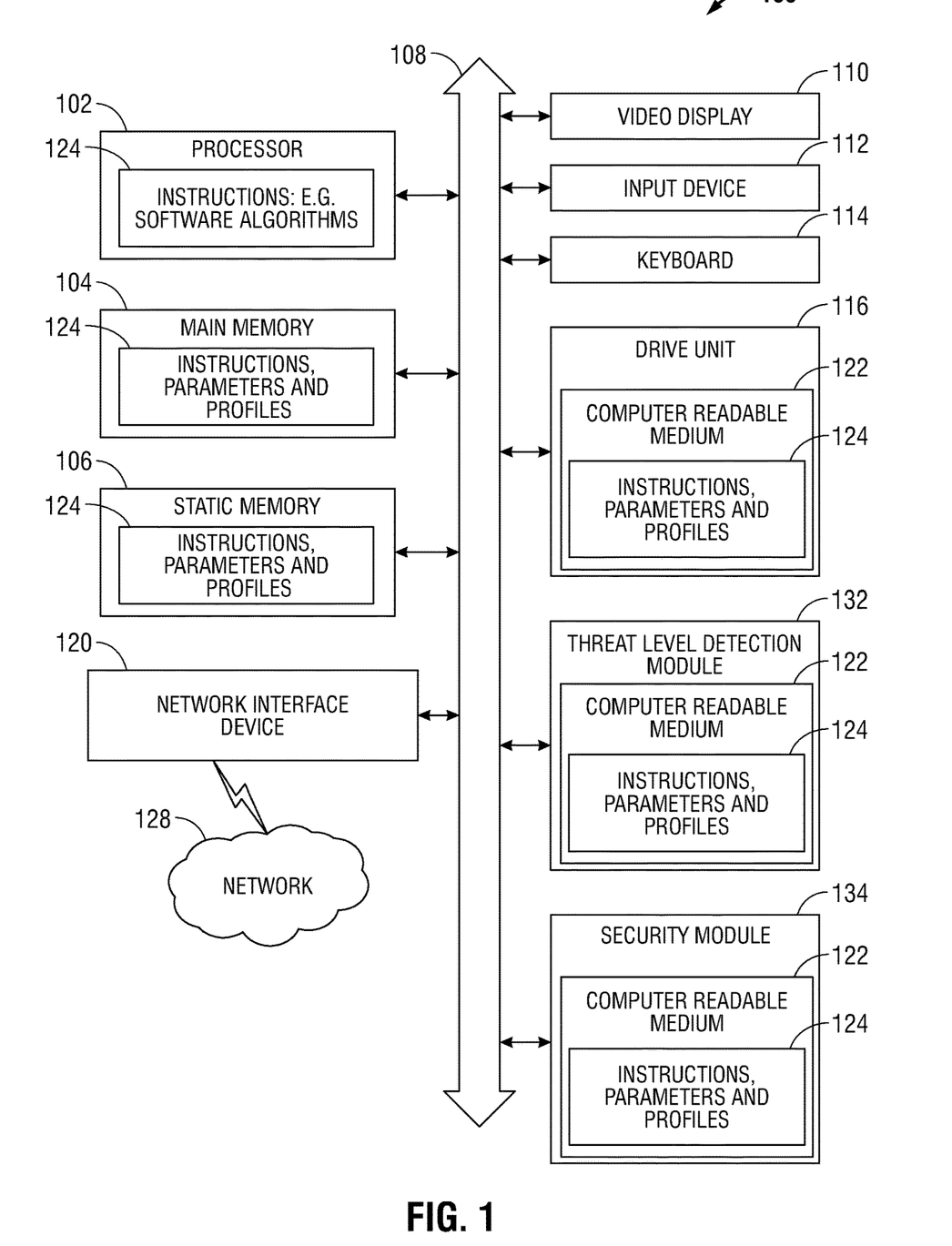
FIG. 1 is a block diagram illustrating an information handling system according to an embodiment of the present disclosure.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions (i.e., software or computer readable program code) for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of threat level detection module 132 and security module 134, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, a solid-state display, or a cathode ray tube (CRT). Additionally, the information handling system 100 may include an input device 112, such as a cursor control device (e.g., mouse, touchpad, or gesture or touch screen input, and a keyboard 114). The information handling system 100 can also include a disk drive unit 116.

The network interface device 120 shown as wireless adapter can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection such as to network 128. Network interface device 120 may be a wireless adapter and may include electronics and structures to support wireless communications. For example, network interface device 120 may include a radio frequency (RF) front end circuit for control and driving data signals on communication bands as well as modulation and demodulation, amplification, and other functions. Network interface device 120 may also include controllers or other processors to execute some or all of the antenna optimization systems. Additionally, network interface device 120 may include a radio module to support one or more wireless communication standard protocols. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer-based functions disclosed herein. For example, instructions 124 may execute a threat level detection module 132, a security module 134, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the threat level detection module 132 and security module 134 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the threat level detection module 132 and security module 134 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the threat level detection module 132 and security module 134 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The threat level detection module 132 and security module 134 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the threat level detection module 132 that may be operably connected to the bus 108. The threat level detection module 132 computer readable medium 122 may also contain space for data storage. The threat level detection module 132 may, according to the present description, perform tasks related to receiving and storing, in memory, labeled data descriptive of operating environment variables related to the information handling system including operating environment variables selected from a basic input/output system (BIOS) setting, an information handling system hardware setting, and at least one of an operating system (OS) environment setting, a developer tool access setting, or a network setting as described herein. The threat level detection module 132 may also perform tasks related to determining a threat level value associated with the operation of the information handling system under the operating environment variables described herein. In an embodiment, the operating environment variables may be derived from a determination of whether the information handling system 100 is communicatively coupled to a network or network location that is at risk of compromise. In an embodiment, the operating environment variables may be derived from a determination of whether BIOS settings, information handling system 100 hardware settings, or the OS settings render the information handling system 100 vulnerable. In an embodiment, the operating environment variables may also be derived from a determination of whether an external device is communicatively coupled to the information handling system.

In an embodiment, the threat level detection module 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

The information handling system 100 may also include security module 134 that may be operably connected to the bus 108. The security module 134 computer readable medium 122 may also contain space for data storage. The security module 134 may, according to the present description, perform tasks related to map the threat level value with a first application being executed on the information handling system and adjust the security level associated with the first application based on the provided threat level value to modify security checks operating with the first application.

In an embodiment, the security module 134 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

During operation, the processor may continuously and in real-time, execute the code of the threat level detection module so as to receive data descriptive of operating environment variables related to the information handling system 100. In an embodiment, the data may be labeled data in the form of metadata that describes the operating environment variables of the information handling system. By receiving data in the form of metadata, the information handling system may reduce the amount of data storage space within the memory 104 of the information handling system. Further, in an embodiment, the metadata may be customized so as to provide that information used by the threat level detection module 132 with particular information that describes the operating environment variables related to the information handling system.

The operating environment variables may be any variables, defined by the data, within which the information handling system is operating. Specific, non-limiting examples of the operating environment variables may include a basic input/output system (BIOS) setting, an information handling system hardware setting, an operating system (OS) environment setting, a developer tool access setting, and a network setting, among others. In the present specification, however, contemplates that any data may be received by the processor 102 executing the threat level detection module 132 that describes characteristics of hardware and software associated with the information handling system that relate to the physical and data security of the information handling system. Specific additional examples of operating environment variables include the execution of a debugger on the information handling system, a presence of a data packet analyzer, debugger privileges, the execution of a virtual machine, the type and location of a wireless access point, the location of the information handling system (i.e., public location or private domicile), whether the information handling system is part of a subnet, the user's profile, hardware usage, and system compliance of any software, firmware, or hardware, among other operating environment variables.

During operation, the information handling system may implement a machine learning process in order to determine a threat level value. This is accomplished by receiving as input (as training data and/or real-time, operational data) the operating environmental variables as described herein and outputting one of a plurality of threat level values such as "safe" and "unsafe with conditions." The threat level may be determined using any type of supervised or unsupervised machine learning process. These supervised and unsupervised machine learning processes may include, but is not limited to, support vector machines, linear regression, logistic regression, naïve Bayes, linear discrimination analysis, decision trees, k-nearest neighbor algorithm, neural networks, and similarity learning, clustering, anomaly detection, neural networks, and any latent carriable models, among others. The selection of the machine learning process may be dependent on the number of input variables, the requested output variables, and learning efficiencies, among other considerations.

As described herein, the threat level detection module and a categorization engine operating with the threat level detection module may be trained before release with the information handling system 100 with telemetry data from other information handling systems. In this example, the telemetry data may be maintained at a localized server or other data storage device such that the localized server is consistently receiving telemetry data via a wired or wireless connection to the other information handling systems.

The machine learning process may be formed as part of the code associated with any application such as a factory installed application. The factory installed application may then, for other applications being executed on the information handling system, expose a number of application program interfaces (APIs). In an alternative embodiment, the machine learning process may be deployed as code in the information handling system as a standalone module and operated in a mode to which the operating system can implement the threat level detection module 132 and its associated machine learning process in order to determine the threat level values as described herein.

The information handling system may also, during operation, execute code associated with the security module 134 to map the determined threat levels to any of a number of individual applications being executed on the information handling system. In an embodiment, the security module 134 may map the threat level value and a context determined for any determined unsafe threat level values to the security checks operating with the execution of any application, wherein the security checks relate to a category of received operating environment variables. The applications to which the mapping is conducted may include any set or sets of computer readable code used to execute a functionality on the information handling system. Examples of the applications may include any applications related to the execution of the basic input/output system (BIOS) of the information handling system, any applications related to the execution of establishing settings related to the hardware of the information handling system, any application associated with the execution of an operating system (OS) and its associated settings, any applications associated with a developer's tool access settings, and/or any application related to a network interface device 120 in order to communicatively couple the information handling system to a wired or wireless computer network.

During operation, the security module 134 of the information handling system may also adjust security levels associated with any of the executed applications based on the provided threat level value in order to modify security checks operating with each of those applications. In an embodiment where the threat level is determined to be "safe," some or all of the security checks related to any given application being executed on the information handling system may be removed in order to increase the response time of these applications. Because these applications no longer needing a number of security checks initiated, the processor may skip those security checks and allow the user to interface with the functionalities of those individual applications quicker. In an embodiment where the threat level is determined to be "unsafe with conditions," those conditions may be taken into consideration prior to any security check associated with any executing application being circumvented. The conditions may include whether the network to which the information handling system is communicatively coupled to is compromised, whether an unsafe device is communicatively coupled to the information handling system, whether the BIOS settings are set to an unsafe level, whether the OS settings are set to an unsafe level, and whether there is malicious activity detected at the hardware or software of the information handling system, among other conditions. Each of these considerations may be taken into account in order to determine which, if any, security checks associated with any given executing application are to be avoided or allowed to maintained.

By executing the code and implementing the hardware described herein, the information handling system may meet confidentiality, integrity, and availability standards via application of appropriate security measures at the information handling system while also dynamically adjusting the security checks related to any number of applications executed on the information handling system in order to provide faster response times for those applications. By implementation of these processes and methods described herein, the response times for certain executed applications may be increased due to avoiding the implementation of certain security checks.

By implementing the methods and processes described herein, the security mechanisms related to any executed application may be dynamically scalable. By dynamically scaling the security mechanisms related to any given application allows for an increase in response time with those applications effected. In some embodiments, by reducing the number of security checks initiated that eliminate any given security mechanism the processor 120 may execute other computer code associated with other applications and functionalities of the information handling system quicker reducing both the data addressed by the processor and time consumed to execute other code.

Additionally, the implantation of the methods described herein related to the threat level detection module 132, the operating environment variables may be categorized (i.e., via a categorization engine) so as to track the types of operating environment variables and compare them to solutions that may exist to remedy any security risks. For example, the categories of operating environment variables may be tracked to implement, a geo-fencing process, Wi-fi SSIDs, detect peripheral devices within a certain range, among other solutions to overcome certain security risks. In an embodiment, the threat level detection module 132 and/or the categorizing engine may be deployed with factory-installed software system having application programming interfaces (APIs) for the information handling system 100. In an embodiment, the threat level detection module 132 and/or the categorizing engine may be a stand-alone software package downloadable at the information handling system 100 after a purchase by a user.

Figure 2:
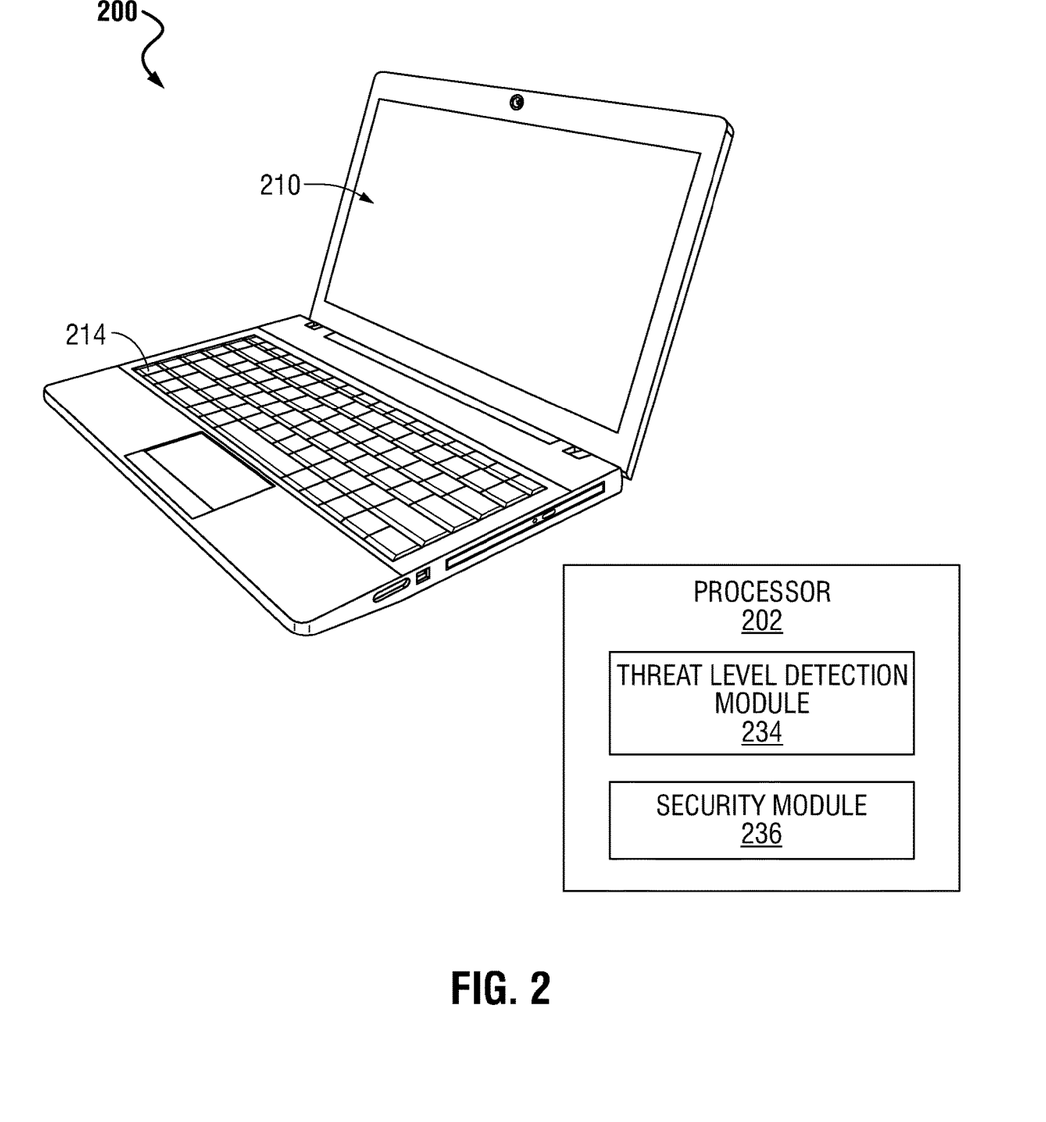
FIG. 2 is block diagram illustrating an information handling system according to an embodiment of the present disclosure.

FIG. 2 is a block diagram illustrating an information handling system 200 according to an embodiment of the present disclosure. Although FIG. 2 shows the information handling system 200 as a laptop-type information handling system, the present specification contemplates that any type of computing device as described herein may be used and FIG. 2 is not meant to be limiting in this manner.

The information handling system 200 may include a processor 202 to or cause to receive, compute, classify, process, transmit, receive, retrieve, originate, switch, store, display, manifest, detect, record, reproduce, handle, or use data produced under the execution of the threat level detection module 234. The threat level detection module 234 may detect, using any number of sensors or data that is used to describe operating environment variables related to the information handling system including operating environment variables selected from a basic input/output system (BIOS) setting, an information handling system hardware setting, an operating system (OS) environment setting, a developer tool access setting, or a network setting. The threat level detection module 234 may, therefor, monitor the data transmission between hardware within the information handling system 200 and determine a threat level value based on all operating environment variables using a machine learning process;

The security module 236 of the information handling system 200 may then provide output to a user via a screen 210 on the information handling system 200 in one example embodiment. The information provided to the user may include data descriptive of the threat level value as well as any affected applications present on the information handling system 200. Because the security module 236 may dynamically adjust the security level associated with the applications based on the provided threat level value to modify security checks operating with the application, the user may be provided with a mapping user interface that maps the threat level to each available application so that the user may determine whether to allow (i.e., either automatically or upon user acceptance) the security module 236 to adjust the security levels associated with any of the applications. In an embodiment, the user may select (e.g., via a keyboard 214, mouse, touchpad, etc.) an option to allow the security module 236 to automatically adjust the security levels of any given application with the option by the user to be notified of such adjustments. In an embodiment, the user may be allowed to determine, by selection, which security levels associated with which applications are to be automatically adjusted by the security module 236 while leaving the user the option to allow the security module 236 to make such adjustments for other applications upon the user's acquiesces. Thus, a graphical user interface may be presented to the user via screen 210 to allow the user to customize how, if, and to what extent the security module 236 is to adjust the security levels of any given application In other embodiments, the user may be prevented from or may have no presented options for adjusting any security levels associated with any applications due to the threat level category or conditions. The threat level detection module 234 may transmit the threat level value to the security module 236 after a determination by the threat level detection module 234 that the threat level is unsafe. For example, an unsafe threat level may indicate that a BIOS setting of the information handling system 200 is unsafe. Because of the relatively higher security concern related to the settings of the BIOS, the security module 236 may not allow any adjustment or may simply maintain any security settings or the security level associated with the BIOS or individual software applications. Other methods may be implemented in order to prevent a user from exposing the information handling system 200 to threats that exceed a certain threshold threat level value;

The information handling system 200, in some embodiments, may include a categorization engine to categorize the received operating environment variables to track which of the operating environment variables are integral to the machine learning process for threat level value determination. As described herein, the operating environment variables may be categorized so as to track the types of operating environment variables and compare them to solutions that may exist to remedy any security risks.

In the present specification and the appended claims, the term "threat level value" is meant to be understood as any value of quality or quantity of threat presented at an information handling system that may compromise the functionality of the information handling system. Examples of a threats may include the subjection of the information handling system to an unprotected connection to a network (either wired or wireless), downloading of unknown software packages, the coupling of a suspicious hardware device to the information handling system, among others. Because these threats may be presented at the information handling system, a value may be assigned to that threat and all threats using the machine learning processes described herein. The present embodiments further account for configuration and settings of hardware, BIOS, OS, networked access and the like in determining the threat level value. Detection of telemetry data determines hardware settings and functions for example.

In the present specification and in the appended claims, the term "security level" is meant to be understood as a level of security implemented at the information handling system to protect the information handling system and applications running thereon from being subjected to malicious activity. This security level may be a qualitative or quantitative value descriptive of which of a number of software packages executed on the information handling system are executing certain security protocols via the processor. For example, a browser application executed by the processor of the information handling system may have a security level value associated with its operation due to the use (or abstention of use) of password access to the application, malware blocking plug-ins, potentiality of network communications being intercepted outside the information handling system, and security of data transmissions to and from the information handling system (i.e., HTTP or HTTPS), among others. Other types of applications may also include other security measures and the use of these security measures may raise or lower the security level of the information handling system.

Figure 3:
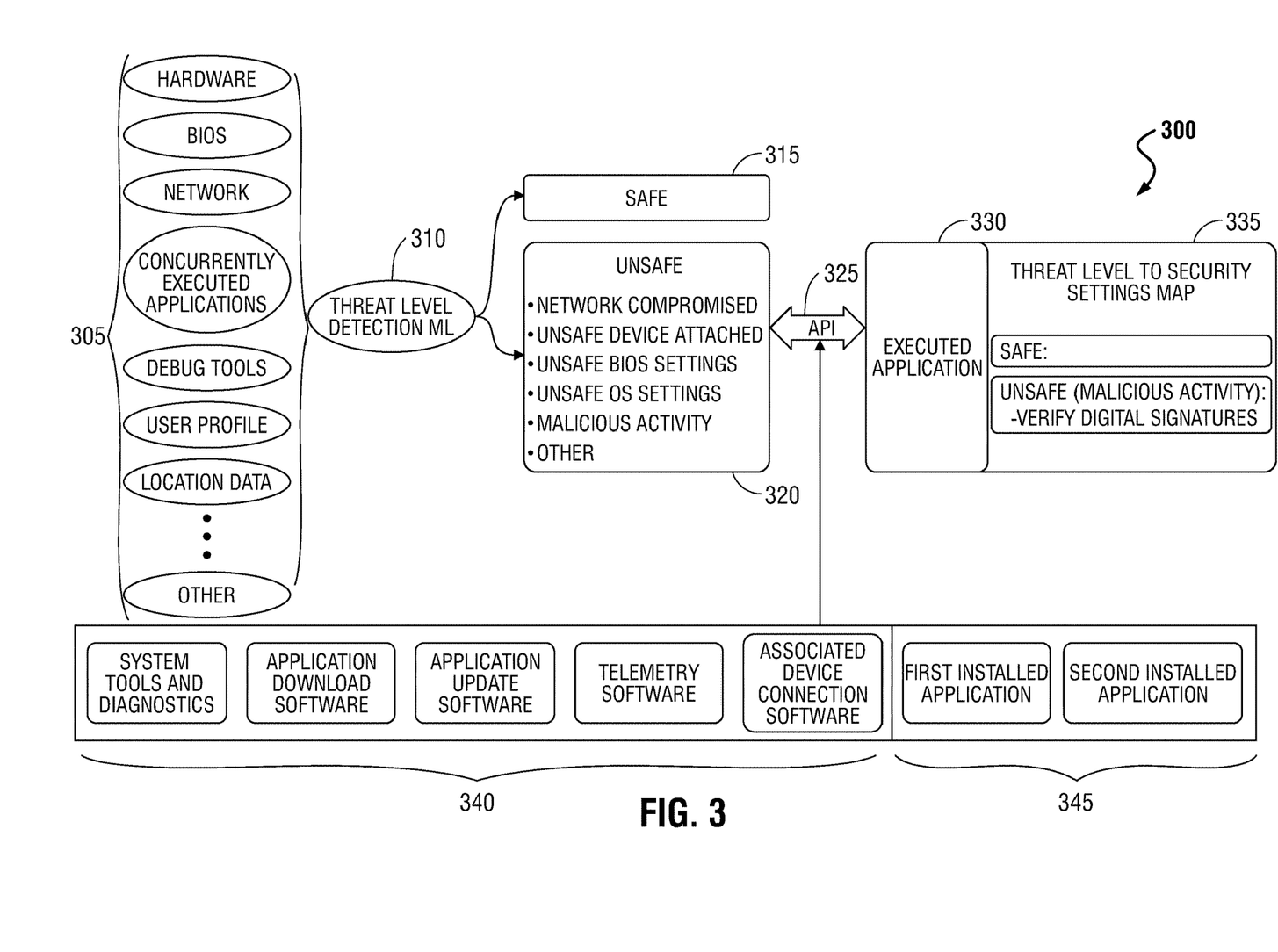
FIG. 3 is a block diagram illustrating the interaction between the threat level detection module, security module, and software packages of an information handling system accord to an embodiment of the present disclosure.

In the present specification and in the appended claims, the term "security measures" is meant to be understood as the implementation of security protocols associated with each application or the information handling system generally. In the example presented above, the security measures associated with a browser application may include password access to the application, malware blocking plug-ins, potentiality of network communications being intercepted outside the information handling system, and security of data transmissions to and from the information handling system (i.e., HTTP or HTTPS), among others. In some examples, these security measures may be initiated or may not be initiated based on the threat level value determined by the threat level detection module 234. In some embodiments, the security measures may include various levels of digital signature verification binaries (i.e., root only, full chain, online revocation check, among others). In an embodiment where the threat level is determined to be "unsafe with conditions" and it is further determined that the number of conditions passes a certain threshold, a full chain with revocation digital signature verification may be conducted. Because the process used to complete the revocation digital signature verification consumes a significant amount of time and resources at the information handling system, the revocation digital signature verification may be conducted only when the threshold number of conditions has been met or exceeded;

FIG. 3 is a block diagram illustrating the interaction between the threat level detection module 310, security module 335, and software packages 340, 345 of an information handling system 300 accord to an embodiment of the present disclosure. The information handling system 300 may receive, at the threat level detection module 310, a data descriptive of a number of operating environment variables 305 as described herein. The source of the operating environment variables 305 may be from a telemetry data source such as a localized server to which a plurality of information handling systems each of which provide data related to operating environment variables in which those information handling systems are within. This data from the telemetry data source may be used by the threat level detection module 310 to train and execute a machine learning process in order to determine a threat level value as described herein. In an embodiment, any training data, if used by the threat level detection module 310 and machine learning process, may be maintained at the information handling system 300 itself for use in additional iterations of the methods and processes described herein. In an embodiment, the threat level detection module 310 may execute the machine learning process using new data from the operating environment variables 305 without being trained and with new data received at the threat level detection module 310 initially.

The operating environment variables 305 may include, in some embodiments, the type of hardware communicatively coupled to or within the information handling system, BIOS settings associated with the information handling system, network settings and hardware, applications being executed concurrently, implementation of debugging tools, a user's profile, and location data of the information handling system, among other operating environment variables 305. Each of these operating environment variables 305 may act as one of a plurality of inputs to the machine learning processes described herein. For example, the input (i.e., the operating environment variables 305) may include data associated with the execution of a word processing document and any add-on applications also being executed and used by the word processing application to increase the functionality thereof. Another example input may include data descriptive of any security measures associated with any hardware and/or software used to allows for the communication of the information handling system across a wired or wireless computer network. Further, example input to the machine learning process may include data describing who has logged onto the information handling system and any data associated with that user's profile (i.e., organization data, trustworthiness status, position in the organization, etc.). Still further, example operating environment variables 305 may include data describing the location of the information handling system such as whether the access point is a trusted or untrusted access point (i.e., in a work or home location or in a public location) and whether the public location renders the screen of the information handling system viewable by others.

In other embodiments, the operating environment variables 305 may include whether a debugger is being executed on the information handling system as well as the user's permissions to access the debugger (i.e., debugger privileges). Because the debugger may attempt to execute a program that may attempt to access unprotected or protected memory, the execution of the debugger may be part of the data used by the machine learning process to provide an output as to whether the threat level of "safe" 315 or "unsafe: with conditions" 320. In other embodiments, the operating environment variables 305 may include whether the user is operating the information handling system as a virtual machine or not. Even further, the operating environment variables 305 may include data describing the execution by the information handling system of any reversing tools such as WIRESHARK®, Fiddler®, SysInternals®, or Spy++® among others. Each of these reversing tools may have been provided access to the applications and communications protocols used by the information handling system and, such implementation of these reversing tools, may provide access to sensitive data at the information handling system. The operating environment variables 305 may be any data received from an original equipment manufacturers' (OEMs') hardware and or virtual machine (VM) systems and may be used by the machine learning process in order to receive on an output variable describing whether the operation of the information handling system is safe 315 or unsafe with conditions 320.

According to any embodiment presented herein, the outcome of the threat level detection module 310 executing the machine learning process may be a binary outcome describing a current operating environment the information handling system 300 is in as being a "safe" operating environment or an "unsafe" operating environment. When the machine learning process has indicated that the operating environment of the information handling system 300 is "safe" the security module 335 may, via API or directly with the execution of an application 330, dynamically adjust the security level associated with the application 330 based on the provided "safe" threat level value in order to modify security checks operating with the application 330. In the example shown in FIG. 3, an API is used by the security module 335 to map the threat level value to that application 330. This mapping may indicate that, because (in this example) the threat level is indicated as being "safe," certain security measures executed by the application 330 may be forgone so as to increase the applications 330 response time. Again, because the operating environment of the information handling system 300 is indicated as being safe, the presently described information handling system 300 may scale the security mechanisms usually implemented by the application 330 down due to less risk of a threat being present. By way of example, the information handling system 300 may be operating in a user's domicile behind a firewall and communicatively coupled to an internet, an intranet, or the Internet. Because the operating environment variables 305 indicates the existence of a single access point detected by the information handling system 300 that is secured, certain applications (i.e., a browser application, a word processing application, a data storage application, a BIOS-related application, among others) may have their respective security measures relaxed by not executing those security measures. These security measures may include a digital signature verification of binaries, file integrity verification, secure erasing of memory for sensitively labeled data, and use of secure enclaves (i.e., INTEL® SGX), among others.

When the machine learning process has indicated that the operating environment of the information handling system 300 is "unsafe" the security module 335 may, via API or directly with the execution of an application 330, maintain or increase security measures based on the conditions presented to the application 330 during the mapping process. These conditions may include certain aspects of the operating environment the information handling system 300 is within. For example, where the information handling system 300 is communicatively coupled to an internet, an intranet, or the Internet, and the threat level has indicated that the connection is unsecure. As such, certain security measures may be maintained at the application 330 (or any other application on the information handling system 300) or even increased. Other "unsafe" conditions exist and may include a compromised network, a malicious or unsafe device communicatively coupled (wired or wirelessly) to the information handling system 300, unsafe BIOS settings, unsafe OS settings, any malicious activity (i.e., current or previously determined breaches by another computing device of the hardware or software of the information handling system 300), a measured BOOT being disabled, the Unified Extensible Firmware Interface (UEFI) secure boot being disabled, lack of a BIOS password being set, a trusted platform module (TPM) being disabled, a network proxy being enabled, the presence of self-signed roots on the OS certificate store, whether a debugger is installed and/or running, whether the OS is running in "safe mode" with unsigned drivers, whether processes are running with not digital signatures associated therewith, whether firewall software is running, and whether the information handling system is running antivirus software or not, among other "unsafe" conditions.

As described herein, the information handling system 300 may include any number of APIs 325 to communicatively couple pre-installed applications 340 or installed applications 345 with the threat level detection module 310 and security module 335. The APIs 325 may be installed at the information handling system 300 along with the other applications 340, 345 as a plug-in associated with the other applications 340, 345 or may be an API 325 that interfaces with any number of applications 330, 340, 345 universally. The API 325 therefore allows the security module 335 to map the threat level value with any application 330, 340, 345 in order to determine which, if any, security measures are to be adjusted.

The pre-installed applications 340 may be any application that is installed on the information handling system 300 prior to purchase of the information handling system 300. These pre-installed applications 340 may include the BIOS, the OS, and any other software that serves a part of the initial purchase of the information handling system 300. These pre-installed applications 340 may include, for example, system and diagnostic tools, application download software, application update software, telemetry software, and/or associated device connection software. Specific examples may include DELL® SupportAssist, DELL® DataVault, DELL® Digital Delivery, DELL® Update Application, DELL® Management Console.

The installed applications 345 may be installed at the information handling system 300 after, for example, purchase of the information handling system 300 by the user. As described herein the application download and update software of the installed applications 345 may facilitate the download and update of the installed applications 345. After download, an API 325 provided by the information handling system 300 or an application specific and source downloaded API 325 may be installed with the installed applications 345 so that the security module 335 may map the threat level with those installed applications 345.

Figure 4:
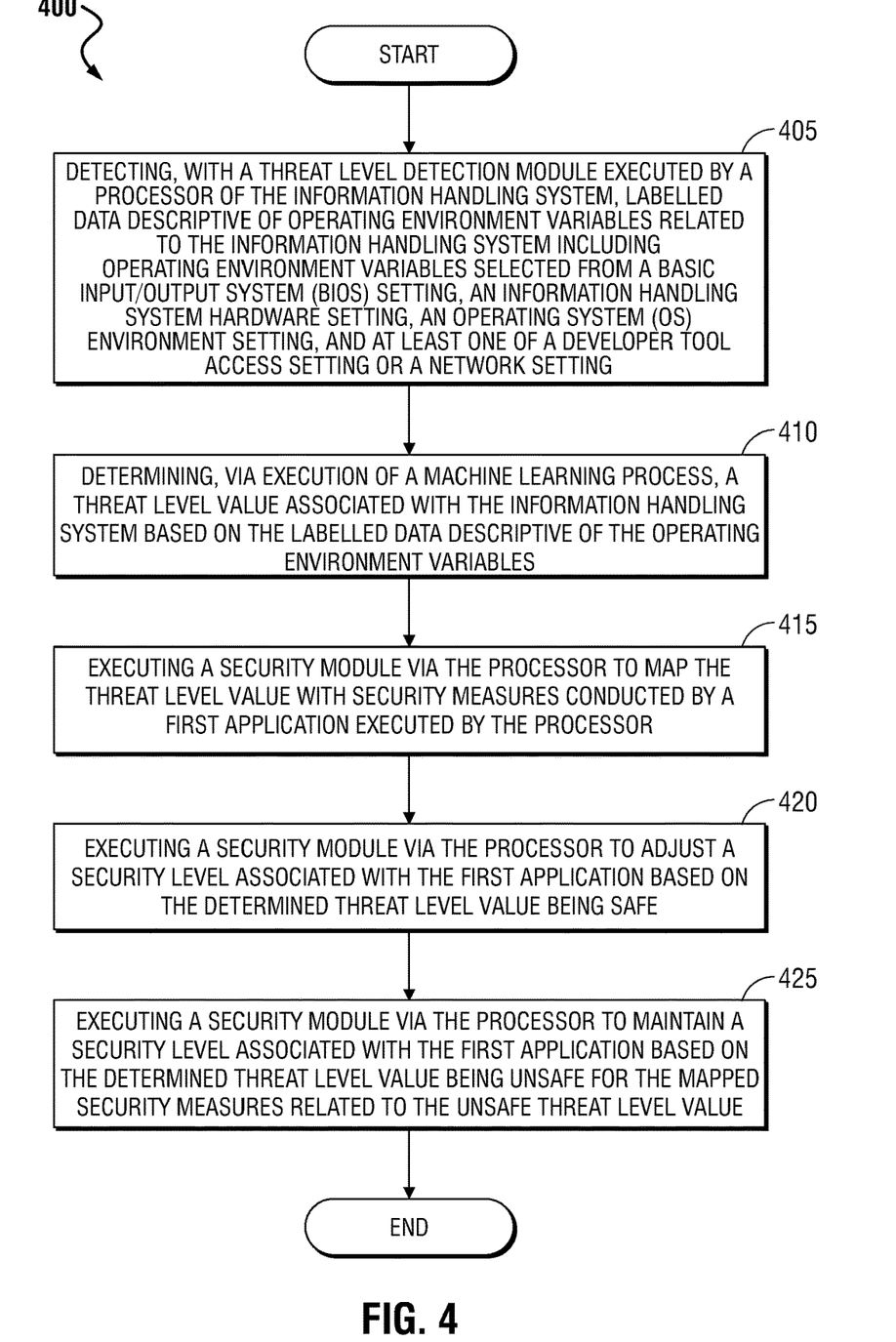
FIG. 4 is a flow diagram illustrating a method of dynamically scaling security settings on an information handling system according to an embodiment of the present disclosure.

FIG. 4 is a flow diagram illustrating a method 400 of dynamically scaling security settings on an information handling system according to an embodiment of the present disclosure. The method 400 may begin at block 405 detecting, with a threat level detection module executed by a processor of the information handling system, labeled data descriptive of operating environment variables related to the information handling system. In an embodiment, the labeled data may include operating environment variables selected from a basic input/output system (BIOS) setting, an information handling system hardware setting, an operating system (OS) environment setting, and at least one of a developer tool access setting, or a network setting.

In an embodiment, the labeled data may be received by the information handling systems described herein in as data used in training the machine learning process. The receipt of this data may be received offline and prior to delivery of the information handling system to the user. In this embodiment, additional unlabeled data may be received during execution of the machine learning process by the user. This results in the unlabeled data being used as input at a trained machine learning process so as to provide output in the form of a threat level value. In an embodiment, the labeled data may be data that is presented to the threat level detection module in the form of metadata to reduce the amount of available space required within a data storage device used for such information. This metadata reduces larger amounts of data, extraneous amounts of data that do not provide further information relative to a determination of a threat level value as described herein. In some embodiments, the labeled data may include data descriptive of a category of received operating environment variables. As described herein, a categorizing module may first receive the data descriptive of operating environment variables and label/reduce that data for consumption by the threat level detection module executing the machine learning process.

The method 400 may continue at block 410 with determining, via execution of a machine learning process a threat level value associated with the information handling system based on the labeled data descriptive of the operating environment variables. As described herein, the threat level value may be determined using a machine learning process that uses, as input, the operating environment variables described herein and outputs a value that describes a current threat the information handling system is subjected. The determination may include two potential output determination based on the threat level value: a "safe" threat level and an "unsafe" threat level. Where the threat level value is indicated by the machine learning process as being "safe," certain security checks associated with any of the applications executed by the information handling system may be adjusted either automatically or by affirmative input from the user. The unsafe threat level may include a number of conditions that allow for the eventual adjustment of some security measures as to some applications and no adjustments as to other applications being executed on the information handling system.

The method 400 may, at block 415, continue with executing a security module via a processor of the information handling system to map the threat level value with security measures conducted by a first application executed by the processor. The mapping process at block 415 may include implementing the categorizing engine described here and the categorization data to apply different mappings of conditions where the threat level detection module and machine learning process has determined that the operating environment variables denote an unsafe threat level. The conditions are mapped to relevant security checks or security measures related to the condition identified with an "unsafe" threat level value.

The method 400 may include, at block 420, executing a security module via the processor to adjust a security level associated with the application based on the determined threat level value being safe. As described herein, the adjustments may include the modification of any security checks of any of the applications being executed by a processor of the information handling system. These include any pre-installed applications or installed applications downloaded by a user after purchase. This assures that a "safe" threat level value has been determined. If not, the method 400 proceeds to 425.

At block 425, executing a security module via the processor will maintain a security level associated with the application based on the determined threat level value being unsafe for the mapped security measures related to the unsafe threat level value. As described herein, the methods 400 and systems conduct a trade-off between relaxed security levels at the application level when it is determined that the information handling system is operating within operating environment variables indicating a safe situation and a potential increase in application response time. Where it is determined that it is unsafe at block 425, the security measures associated with each application may be maintained in order to prevent the data and hardware on the information handling system from being exposed to malicious hardware, software, or communications. At this point, the method 400 may end.

Figure 5:
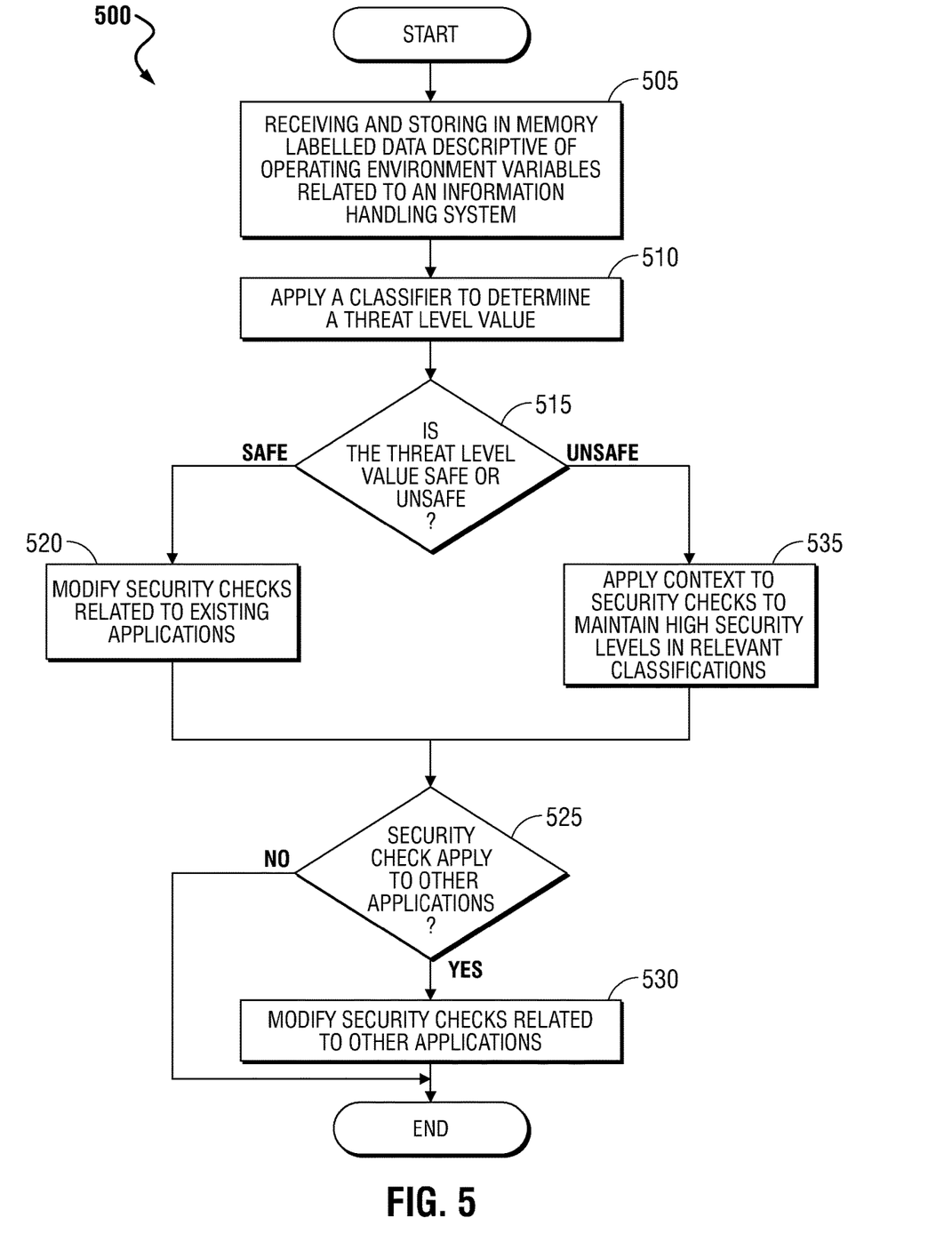
FIG. 5 is a flow diagram illustrating a method of dynamically scaling security settings on an information handling system according to an embodiment of the present disclosure.

FIG. 5 is a flow diagram illustrating a method 500 of dynamically scaling security settings on an information handling system according to an embodiment of the present disclosure. The method 500 may begin at block 505 with receiving and storing in memory labeled data descriptive of operating environment variables related to an information handling system. The memory used to store the labeled data may be associated with the information handling system such that the categorizing module may have access to the data when executing the machine learning processes described herein. In an example embodiment, the memory may be a device located remotely to the information handling system such as a telemetry data source at a central server. In an example, the memory may be located, physically, on the information handling system.

The method 500, in the present embodiment and any embodiment described herein, may continue with applying, at block 510, a classifier or other machine learning process to determine a threat level value. The classifier may categorize any received operating environment variables. The classifier may be a multi-level classifier, a binary classifier, or a combination thereof. In the case where the classifier is a binary classifier, the threat level detection module and machine learning process may classify each operating environment variable as contributing to a safe classification or an unsafe classification with certain classifications indicating as an unsafe operating environment variable providing a determination that the current operating environment is unsafe with certain conditions being provided. As described with respect to the embodiments herein, the threat level is determined using the machine learning process that was trained using labeled data prior to delivery of the information handling system to the user.

The method 500 continues with a determination at block 515 as to whether the threat level value has been indicated as safe or unsafe. Where the threat level is determined as being safe ("safe" determination at block 515) the method 500 may continue with modifying security checks related to applications executable at the information handling system at block 520. Such modifications to the security checks may include, without limitations, forgoing digital signature checks related to the execution of certain applications, eliminating encryption of data prior to sending it from the information handling system (i.e., in an intranet), forgoing file integrity verification, forgoing secure erasing of memory for sensitive data, and forgoing the use of secure enclave (i.e., INTEL® SGX), among other reductions in security checks. After the security checks are modified at block 520, the method 500 may also include a determination at block 525 as to whether similar security check modifications can be applied to other applications. If not, the method 500 may end. If the security checks can be applied to other applications, similar changes to the security check modifications may be applied to those other applications. The determination as to whether the security check modifications can apply to other applications (block 525) may include comparing the type of applications with other applications or whether the determined threat level value applies similarly to other applications. By way of example, where two different browser applications have been installed on the information handling system, the determination may detect that both applications have a similar purpose (i.e., granting access to the Internet) and similar security levels via modification of the security checks should be applied to both browser applications. Other types of comparisons may be made among the applications and the present specification contemplates these types of comparisons in order to apply one set of security checks to an application based on the characteristics it shares with another application.

Where it is determined at block 515 that the threat level is unsafe, the method 500 may continue at block 535 with applying context to security checks associated with any given application so as to maintain a relatively high security level in relevant classifications. By way of an example embodiment, the context may be associated with network security. In this example embodiment, because the threat level is indicated as being unsafe, those applications that may send data over a wired or wireless network may have all security checks maintained. However, in this example, other applications that may not necessarily interact with data over the network may be relaxed due to the unsafe conditions not affecting the functionality of those other applications (i.e., calculator application, word processing application, and graphical user interface applications, among others). Other classifications may not be relevant to the unsafe threat value determined and may be at relatively low risk of threat. The security checks associated with these relatively low risk threat classifications may be modified in some embodiments.

Again, where security checks may be applied to other applications (determination "yes" at block 525), those security check modifications may also be applied to those other applications. After the modifications are made to the other applications at block 530 the method 500 may end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
a hardware processor to execute code instructions of a threat level detection module to receive and store in memory labeled data descriptive of operating environment variables related to the information handling system including a basic input/output system (BIOS) setting, and an information handling system hardware setting;
the hardware processor to execute code instructions of a threat level detection module to further receive and store in memory labeled data descriptive of operating environment variables including at least one of an operating system (OS) environment setting, a developer tool access setting, or a network setting;
the hardware processor to determine, via execution of a machine learning module of the threat level detection module, a threat level value; and
the hardware processor executing code instructions of a security module associated with a first application executed on the information handling system to:
map the threat level value with the first application; and
adjust the security level associated with the first application based on the provided threat level value to modify security checks operating with the first application,
wherein modifying the security checks operating with the first application includes forgoing a digital signature check related to the execution of the first application by the hardware processor when the provided threat level value meets a safe categorization.

2. The information handling system of claim 1, wherein the hardware processor executes code instructions of a categorization engine to categorize the received operating environment variables to track which of the operating environment variables are integral to the machine learning module for threat level value determination.

3. The information handling system of claim 2, wherein mapping of the threat level value with the first application includes mapping the threat level value and a context determined for any determined unsafe threat level values to the security checks operating with the execution of the first application, wherein the security checks relate to a category of received operating environment variables.

4. The information handling system of claim 1, wherein the threat level value is indicated as one of a safe threat level value or an unsafe threat level value with the unsafe threat level value providing a context value describing how the unsafe threat level value is unsafe relative to an execution of the first application.

5. The information handling system of claim 1, wherein the operating environment variables are derived from a determination of whether the information handling system is communicatively coupled to a network or network location that is at risk of compromise.

6. The information handling system of claim 1, wherein the operating environment variables are derived from a determination of whether BIOS settings, information handling system hardware settings, or the OS settings render the information handling system are vulnerable.

7. The information handling system of claim 1, wherein the operating environment variables are derived from a determination of whether an external device is communicatively coupled to the information handling system.

8. The information handling system of claim 1, wherein the threat level detection module and the categorization engine operating with the threat level detection module are trained before release with the information handling system with telemetry data from other information handling systems.

9. The information handling system of claim 1, wherein the threat level detection module is deployed with another factory-installed software system having APIs for the information handling system.

10. A method of dynamically scaling security settings on an information handling system, comprising:
detecting, with a threat level detection module code instructions executed by a hardware processor of the information handling system, labeled data descriptive of operating environment variables related to the information handling system including a basic input/output system (BIOS) setting, an information handling system hardware setting, and an operating system (OS) environment setting;
detecting, with a threat level detection module code instructions executed by a hardware processor of the information handling system, labeled data descriptive of operating environment variables related to the information handling system further including at least one of a developer tool access setting, or a network setting;
determining, via execution of code instructions of a machine learning module, a threat level value associated with the information handling system based on the labeled data descriptive of the operating environment variables;
executing code instructions of a security module via the hardware processor:
to map the threat level value with security measures conducted by a first application executed by the hardware processor; and
to adjust a security level associated with the first application based on the determined threat level value being safe including modifying security checks operating with the first application by forgoing a digital signature check related to the execution of the first application by the hardware processor; and
to maintain a security level associated with the application based on the determined threat level value being unsafe for the mapped security measures related to the unsafe threat level classification value.

11. The method of claim 10, comprising categorizing the operating variables to track which of the operating variables are integral to the application or not.

12. The method of claim 10, wherein determining, via execution of code instructions of a machine learning module, a threat level classification value associated with the information handling system based on the labeled data descriptive of the operating environment variables includes the threat level being indicated as either a safe threat level classification value or an unsafe threat level classification value with the unsafe threat level providing context describing how the threat level is unsafe relative to an execution of the application.

13. The method of claim 10, wherein the operating variables are derived from a determination of whether unsafe basic input/output system (BIOS) or the operating system (OS) includes settings that render the BIOS or OS vulnerable.

14. The method of claim 10, wherein the operating variables are derived from a determination of whether an external device is communicatively coupled to the information handling system.

15. An application optimization information handling system, comprising:
a hardware processor to execute code instructions of a threat level detection machine learning module;
the hardware processor to execute code instructions of a security module associated with first application executed by the hardware processor to:
dynamically receive, from the threat level detection machine learning module, a dynamic threat level value based on operating environment variables selected from:
a basic input/output system (BIOS) setting;
an information handling system hardware setting; and
at least one of an operating system (OS) environment setting, a developer tool access setting, or a network setting; and
adjust a security level associated with the first application based on the dynamic threat level value indicating a safe threat level classification value to reduce implemented security measures wherein the adjustment to the security level includes a modification to a security check by eliminating encryption of data prior to the information handling system sending the data from the information handling system across a network and forgoing a digital signature check related to the execution of the first application by the hardware processor; and
maintain a security level associated with the first application based on the dynamic threat level classification value indicating an unsafe threat level classification value and a context value of the unsafe value for mapped security measures related to the context value of the unsafe threat level classification value.

16. The application optimization information handling system of claim 15, wherein the security module maps a threat level classification value with the first application to determine to what extent to adjust the security level associated with the application.

17. The application optimization information handling system of claim 15, further comprising:
the hardware processor executing code instructions of a categorizing module to categorize the operating variables to track which of the operating variables are integral to the first application or not.

18. The application optimization information handling system of claim 15, wherein the threat level is indicated as either a safe threat level classification value or an unsafe threat level classification value with the unsafe threat level providing context describing how the threat level is unsafe relative to an execution of the first application.

19. The application optimization information handling system of claim 15, wherein the operating variables are derived from a determination of whether a network the information handling system is communicatively coupled to is compromised.

20. The application optimization information handling system of claim 15, wherein the operating variables are derived from a determination of whether unsafe BIOS operation will occur or the OS includes settings that render the BIOS or OS vulnerable.

* * * * *